(12) United States Patent
Anglsperger

(10) Patent No.: US 6,443,484 B2
(45) Date of Patent: Sep. 3, 2002

(54) DECORATIVE COVERING FOR AIR BAG COVERS

(75) Inventor: Erwin F. Anglsperger, Eggenfelden (DE)

(73) Assignee: Eldra Kunststofftechnik GmbH, Vilsburg (DE)

( * ) Notice: Subject to any disclaimer, the term of this patent is extended or adjusted under 35 U.S.C. 154(b) by 0 days.

(21) Appl. No.: 09/791,891

(22) Filed: Feb. 26, 2001

Related U.S. Application Data

(63) Continuation of application No. PCT/EP99/06181, filed on Aug. 23, 1999.

(30) Foreign Application Priority Data

Aug. 25, 1998 (DE) ............................................. 198 38 603

(51) Int. Cl.⁷ ............................................. B60R 21/20
(52) U.S. Cl. ................................................. 280/728.3
(58) Field of Search ........................... 280/728.3, 728.2, 280/731, 732

(56) References Cited

U.S. PATENT DOCUMENTS

| | | | | |
|---|---|---|---|---|
| 5,499,842 A | * | 3/1996 | Yamamoto et al. ...... | 280/728.3 |
| 5,685,056 A | * | 11/1997 | Fischer .................... | 280/728.3 |
| 5,730,460 A | | 3/1998 | Niederman ................ | 280/731 |
| 5,851,022 A | * | 12/1998 | Yamamoto et al. ...... | 280/728.3 |
| 5,913,534 A | * | 6/1999 | Klingauf ................. | 280/728.3 |
| 5,957,483 A | | 9/1999 | Miltenberger et al. ... | 280/728.3 |
| 6,105,999 A | * | 8/2000 | Johnson ..................... | 280/727 |
| 6,135,489 A | * | 10/2000 | Bowers ................... | 280/728.3 |

FOREIGN PATENT DOCUMENTS

| | | |
|---|---|---|
| DE | 296 07 536 U1 | 9/1996 |
| DE | 195 16 230 A1 | 11/1996 |
| DE | 196 53 797 A1 | 6/1998 |
| GB | 2 300 159 A | 10/1996 |
| WO | WO 00/10840 | 3/2000 |

* cited by examiner

Primary Examiner—Paul N. Dickson
Assistant Examiner—Faye M. Fleming
(74) Attorney, Agent, or Firm—Sughrue Mion, PLLC

(57) ABSTRACT

A decorative layer for an air bag covering, especially for use in motor vehicles, is provided with a local initiating area in the decorative layer, the tear for tearing through the decorative layer when the air bag is deployed being initiated in this area. The air bag covering, includes a shaped part with predetermined break-lines and a decorative layer applied to the shaped part. At least one locally limited initiating area is provided in the decorative layer, the tear for tearing through the decorative layer when the air bag is deployed being initiated along the predetermined break-lines of the shaped part, in this area.

12 Claims, 2 Drawing Sheets

DECORATIVE COVERING FOR AIR BAG COVERS

This application is a continuation of PCT/E99/06181 filed Aug. 23, 1999.

BACKGROUND OF THE INVENTION

1. Field of the Invention

The invention relates to a decorative covering for air bag covers, especially for use in motor vehicles. The invention also relates to an air bag cover comprising a molding including designed burst lines and a decorative covering applied to the molding, for example, for use in a motor vehicle.

A molding as defined in the following is a component protecting or covering an air bag operating means as well as the air bag impact padding, it comprising designed burst lines or locations which on deployment of the air bag burst by the impact padding in assuring emergence of the impact padding.

Such air bag systems are well-known in motor vehicles, it being particularly air bags incorporated in the steering wheel or dashboard for reducing the risk of injury to the driver and front-seat occupant in a head-on collision that find wide application, although air bag systems incorporated in the doors, door pillars or seats for protecting the driver and front-seat occupant from injury by side impact have also since become popular. Air bag systems are likewise incorporated on the rear side of the front seats so that occupants in the rear of the vehicle can be protected by air bag systems.

2. Prior Art

Moldings for air bag covers are often injection molded in plastics materials, other known methods of production being, for example, foaming parts of plastics materials or foaming metal parts in place. To ensure satisfactory functioning of the air bag systems these moldings are provided with designed burst lines or locations which burst open at a predefined bursting force and ensure satisfactory deployment of the air bag located underneath. To enhance the visual finish and feel or to adapt air bag covers to the interior finish of the vehicle the moldings are often lacquered or provided with a decorative covering. Depending on the interior finish of the vehicle such decorative coverings are made of genuine leather, substitute leather such as Alcantara or artificial leather, or of films of plastics.

The designed burst lines usually divide the molding of the air bag cover into one or more portions which on inflation of the air bag in the air bag module form one or more flaps on bursting of the designed burst line which open up to the side to allow the air bag to deploy charged with the gas made available by the inflator.

In accordance with prior art decorative coverings of leather are fabricated multiply sectioned and stitched together in the region of the designed burst lines of the molding. Depending on the designed bursting force the stitch length, strength and material of the thread are selected so that for a defined bursting force the thread snaps to permit satisfactory emergence of the impact padding. When such decorative coverings are stitched together the seam needs to be precisely positioned on the designed burst lines so that when the air bag is deployed the impact padding is able to satisfactorily emerge by the thread snapping. Precisely positioning the stitched leather decorative covering on the molding is extremely difficult since during lamination or rear foaming the decorative covering may be distorted which spoils the visual appeal and may even result in rejection of the leather decorative covering already fabricated at high expense. In addition, where for instance an air bag cover for an impact pot is incorporated in a steering wheel, a highly complicated form of burst seam is needed which can only be produced by intensive labor at high expense.

Disclosed by European patent application 0 428 935 is an air bag cover in which a molding covering the air bag operating means and the air bag impact padding is provided which comprises burst lines designed to burst open on deployment of the air bag in assuring emergence of the air bag impact padding. The molding is covered by a decorative covering of a vinyl plastics which is weakened all along the designed burst lines of the molding by it being nicked. Nicking the decorative covering is implemented on a pliant base. The problem in this prior art is that nicking the decorative covering down to a predefined remaining thickness is difficult to implement.

Described in the German laid-open patent 195 16 230 is a method for reducing the material thickness of the decorative covering along the designed burst lines of the molding to facilitate initial bursting of the decorative covering when the air bag is deployed. For this purpose the decorative covering is placed on greatly restrict the freedom in designing such air bag covers, resulting in compromises either as to the visibility of burst lines on the surface of the cover lid or on the design geometry of the flaps and the surface of the cover lid. Hitherto in this arrangement the weakened portions in the decorative covering extended along the full length of the designed burst lines of the molding of the air bag cover.

Known from EP 0 770 522 A1 is an air bag arrangement comprising a decorative covering, a foamed layer and a backing. The air bag cover has notches at the edge in the decorative covering as well as in the backing for initiating bursting.

SUMMARY OF THE INVENTION

The invention is based on the object of providing an air bag cover as well as a corresponding decorative covering for air bag covers which are simple and cost-effective in production whilst permitting high freedom in designing the surface of the air bag cover and decorative covering as well as the flap geometry in ensuring instant bursting of the decorative covering and molding of the air bag cover located therebelow when the air bag is deployed.

This object is achieved by a decorative covering having the features as set forth in claim 1 and by an air bag cover having the features as set forth in claim 6.

The gist of the invention is, for the first time, to weaken the decorative covering not along the entirety of the designed burst lines of the molding, but merely in a locally confined initiating site. Tests have indicated that weeakening the decorative covering in an initiating site results in stress peaking at the base of the notch in the initiating site when the air bag is deployed. It is this stress peak that initiates bursting at ed, bursting progresses to totally part the decorative covering without the decorative covering having been previously weakened outside of the initiating site.

It is thus now possible, for the first time, to burst the decorative covering by weakening only a locally confined site, the initiating site, so that bursting is initiated there. When such a decorative covering is employed on an air bag cover, the decorative covering is applied to the molding comprising the designed burst lines so that the decorative covering covers at least one locally confined initiating site at which bursting the decorative covering is initiated along the designed burst lines of the molding when the air bag is deployed. Since in accordance with the invention the decorative covering is machined only in a locally confined initiating site so that due to the notch effect bursting is initiated in this precisely defined locally confined initiating site, there is now no need for complicated machining of the decorative covering along the designed burst lines of the molding. In addition, there is now no need for design grooves which correspondingly restrict the freedom in design since there is now no longer any need to compensate tolerances stemming from fabrication of the decorative covering by the design grooves. It is the stress peak at the base of the notch of the initiating site that initiates bursting of the decorative covering, bursting then progressing along the designed burst lines of the molding.

When the air bag is deployed it is thus assured that both the molding and the decorative covering applied thereto burst totally and instantly in a defined site so that one or more flaps are formed which open up to the side to allow the air bag to deploy charged with the gas made available by the inflator.

In accordance with one preferred embodiment the initiating site of the decorative covering is formed by reducing the thickness of the decorative covering for which various known methods may be put to use, for example, nicking the rear of the decorative covering or weakening the decorative covering with the template sharpening gaps as described in German laid-open patent 195 16 230. Reducing the thickness of the decorative covering in this way results in the decorative covering bursting in this weakened site due to the stress peak at the base of the notch when the decorative covering is subjected to the forces in deploying the air bag, thus causing bursting to be initiated at this location. As soon as the decorative covering has started to burst at this locally confined initiating site bursting progresses along the rupturing designed burst lines of the molding.

In another embodiment it is provided for that the locally confined initiating site of the decorative covering is formed by a window in the decorative covering, for example, by a through-hole. Here too, the forces acting on the decorative covering result in stress peaking at the base of the notch when the air bag is deployed so that bursting is initiated in the precisely defined initiating site. Due to the designed burst lines of the molding bursting underneath the decorative covering, bursting in the decorative covering progresses along the designed burst lines of the molding. Preferably the contour of the initiating site of the decorative covering comprises sharply tapered sections to boost the notching effect of the initiating site. The contour of the initiating site may be, for example, rhombic, or circular with linear nicks, although, of course, other geometries for configuring the site for initiating bursting are conceivable.

In one particularly preferred embodiment it is provided for that the initiating site of the decorative covering is arranged concealed under an exposed insert secured to the molding. Such exposed inserts are often applied to the air bag covers and configured as emblems or logos or quite generally as trim. The exposed inserts often including vehicle make symbols or indications as to the air bag concealed beneath the cover. The exposed insert may also be configured in two or more parts where necessary. When the locally confined initiating site for initiating bursting of the decorative covering on deployment of the air bag is concealed under an exposed insert secured to the molding, the initiating site may be designed solely in accordance with the criteria relevant to initiating bursting without having to take into account the design and visual appeal.

Preferably an arresting element is secured to the exposed insert so that it cannot be torn out of place, and connectable to a mounting part to prevent the exposed insert from being released at random from the mounting part when the air bag is deployed. This makes sure that although the exposed insert effectively conceals the initiating site of the decorative covering there is no additional risk of vehicle occupants being injured. Otherwise, when the air bag is deployed the exposed insert might be torn away as a whole from its mount and capatapulted into the vehicle interior or the exposed insert could fragmentize and likwise pose a risk of injury to the vehicle occupants. By safeguarding the exposed insert with a safe arresting element the exposed insert is prevented from being catapulted or fragmentized in being released from its mount; instead, when the air bag is deployed the exposed insert is held captive by the arresting element so that only a defined item can gain access to the vehicle interior.

In accordance with another preferred embodiment the molding too, comprises a locally confined initiating site coinciding in location with the initiating site of the decorative covering and in which bursting the designed burst lines of the molding is initiated when the air bag is deployed. In this way initiating bursting in the molding and bursting in the decorative covering can take place in a common initiating site arranged ideally concealed beneath an exposed insert. By providing a common initiating site for the molding and decorative covering, bursting of the decorative covering is improved since bursting the molding and decorative covering respectively is initiated at the one and the same location to thus also define the direction in which bursting progresses for both the decorative covering and molding. Should the location of initiating bursting of the molding not coincide with the initiating site of the decorative covering this might result in problems in bursting the decorative covering and molding.

Preferably the initiating site of the molding is configured as a through-hole which in one preferred embodiment is configured so that it can be made use of to secure, for example, a clip or rivet of an exposed insert, although of course, the exposed insert may also be secured to the molding by ultrasonic welding, bonding or some other means of connection.

Preferably the decorative covering is made of leather or a substitute leather, such as artificial leather, ALCANTARA, LORICA or something similar, although of course depending on the location and configuration in the vehicle interior it may also be made of a plastics film of polyurethane (PUR), polvinyl chloride (PVC), acrylonitrile acrylic ester (ASA) or acrylonitrile butadiene styrene (ABS).

In accordance with the embodiment as last preferred the designed burst lines are arranged so that when the air bag is deployed several flaps are opened up. Preferably the designed burst lines of the molding are configured in the shape of an H or X, resulting in two or four flaps materializing for opening up when the air bag is deployed, i.e. so that the air bag is able to unfold charged with gas made available by the inflator. Where a H-shaped designed burst line is concerned the exposed insert may be arranged, for example, so that at least part of the transverse designed burst line is concealed. When a X-shaped designed burst line configuration is provided the exposed insert may be arranged for example at the intersection of the designed burst lines.

BRIEF DESCRIPTION OF THE DRAWINGS

Several example embodiments of the invention will now be detailed for further explanation and a better understanding, with reference to the attached drawings in which.

DESCRIPTION OF EXAMPLE EMBODIMENTS OF THE INVENTION

Figure 1:
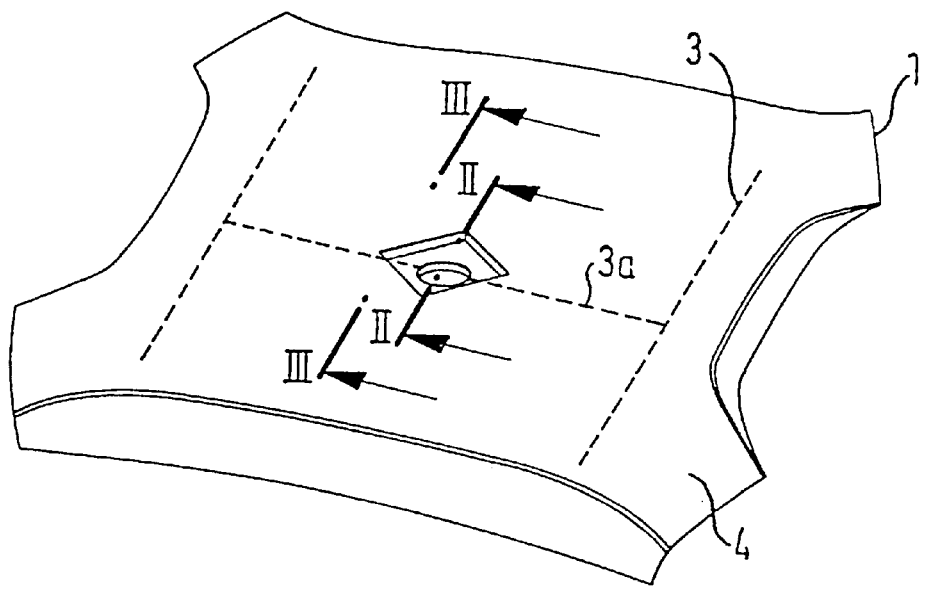
FIG. 1 is a view in perspective of the air bag cover in accordance with the invention.

Referring now to FIG. 1 there is illustrated an air bag cover in accordance with the invention as may be put to use, for example, for an air bag system incorporated in a steering wheel. Making use of the air bag cover is preferably provided for in motor vehicles, although of course such air bag covers can be put to use in other means of passenger transport such as aircraft, trains or ships. Applied to a molding 1 is a decorative covering 4, the molding 1 comprising designed burst lines 3, 3a. In accordance with the invention the decorative covering 4 comprises an initiating site 5 which is locally confined and in which bursting the decorative covering 4 is initiated when the air bag is deployed. In the example embodiment as shown in FIG. 1 the decorative covering 4 is windowed in the initiating site 5, this through-hole being configured so that two V-shaped portions are formed which combine to form in all a rhombic initiating site. To enhance the notch effect the apexes of the two Vs point in the direction of the designed burst lines 3. 3a of the molding 1. Instead of a through-hole in the decorative covering 4 it is often sufficient to merely weaken the decorative covering 4 in the initiating site 5. One such weakening may take the form of, for example, a nick in the rear side of the decorative covering 4 and a reduction in the thickness of the decorative covering 4 by means of sharp template ridges or in making use of a laser. In the thus weakened initiating site 5 the forces acting on the decorative covering 4 and initiating site 5, when the air bag is deployed due to the notch effect caused by the weakening of the material, result in stress peaking at the base of the notch. This stress peak results in bursting being initiated at the base of the notch, bursting then progressing also through the non-weakened portions of the decorative covering 4.

Figure 2:
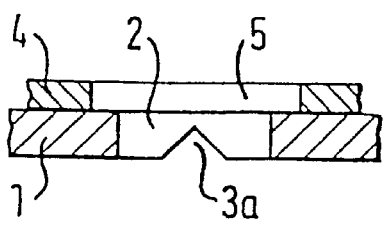
FIG. 2 is a section taken along the line II—II as shown in FIG. 1.

Referring now to both FIG. 1 and FIG. 2 there is illustrated how the molding 1 likewise comprises an initiating site 2 in which bursting is initiated for bursting the designed burst line 3a of the molding 1 when the air bag is deployed. Weakening the molding 1 in the initiating site 2 results in stress peaking at the base of the notch of the initiating site when the air bag is deployed. Due to this stress peak at the base of the notch, bursting is initiated in this precisely defined, locally confined initiating site 2. Due to the forces continuing to act on the molding 1, when the air bag is deployed, bursting progresses along the designed burst lines 3a and 3. The notchings or weakenings of the molding 1 along the designed burst lines 3 and 3a result in stress peaking along these designed burst lines to thus cause bursting to progress along these precisely predefined designed burst lines 3 and 3a.

Figure 3:
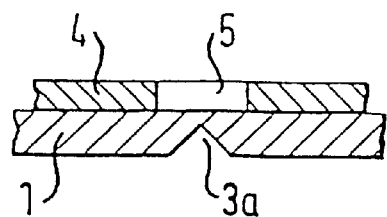
FIG. 3 is a section taken along the line III—III as shown in FIG. 1.

Referring now to both FIG. 2 and FIG. 3 there is illustrated how the designed burst lines 3 and 3a of the molding 1 are provided such that only the side of the molding 1 facing away from the decorative covering 4 is notched. In this way it is achieved that the designed burst lines 3 and 3a remain invisible to the exterior which enhances the freedom in design and surface finish.

Figure 4:
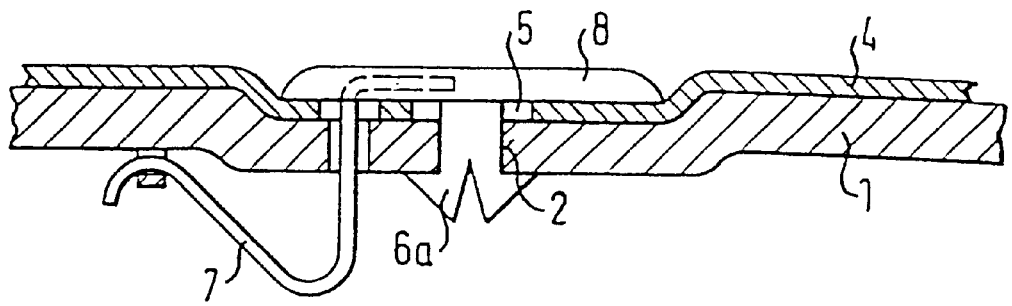
FIG. 4 is a section through an air bag cover in accordance with the invention including an exposed insert and an arresting element.

In FIG. 1 the initiating site 2 of the molding 1 is configured as a round through-hole, This configuration in the form of a round through-hole has the advantage that the through-hole in addition to initiating bursting may simultaneously serve to secure an exposed insert 8 to the molding 1. A non-circular contour of the through-hole may additionally serve in this arrangement as a means for preventing turning of the exposed insert. Referring now to FIG. 4 there is illustrated an exposed insert 8 secured to the molding 1 by a clip 6a. To prevent random break-out or unbuttoning of the exposed insert 8 from the molding 1 when the air bag is deployed an arrester element 7 has been integrated in the exposed insert 8 to thus reduce the risk of injury to the vehicle occupants. In this arrangement the arrester element 7 may be, for example, a tough thread or wire cast in place in the exposed insert 8 or secured to the exposed insert 8 by some other ways and means. Since, due to the very high acceleration forces acting on the exposed insert 8 when the air bag is deployed, the exposed insert 8 may not only break away from the molding 1 but also fragmentize, the arrester element 7 may also be integrated as a fabric or film in the exposed insert 8 so as to prevent not only random release of the exposed insert 8 from the molding 1 but to prevent fragments from gaining random access to the vehicle interior. In this arrangement the arrester element 7 may be fixedly connected to the molding 1 either by welding or bonding or subsequently applied to the molding 1. Preferably the exposed insert 8 is configured as an emblem or logo providing either vehicle make symbols or indications as to the air bag concealed beneath the cover.

As evident from FIG. 4 it is possible to totally conceal the initiating site 5 of the decorative covering 4 and the initiating site 2 of the molding 1 beneath the exposed insert 8 to thus enable the initiating site 2 and initiating site 5 to be configured so that initiating bursting is an optimum without detrimenting the outer design of the air bag contour since the exposed insert 8 conceals the initiating sites 2 and 5.

Figure 5:
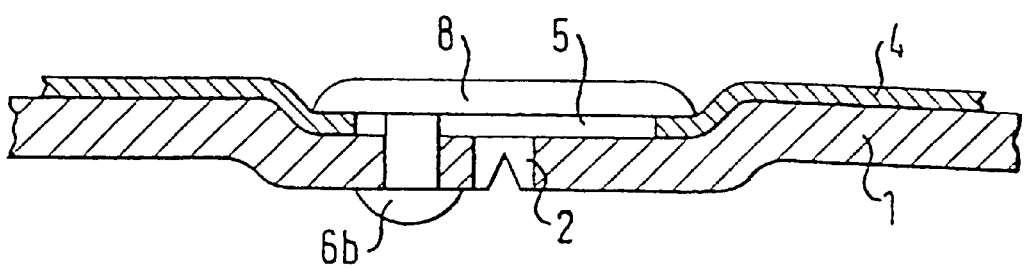
FIG. 5 is a section through a further embodiment of an air bag cover including an exposed insert.

Referring now to FIGS. 4 and 5 there is illustrated two different ways of securing exposed inserts 8 to the moldings 1. FIG. 4 shows a fastener including a clip 6a whilst FIG. 5 shows a fastener including a rivet 6b. In this arrangement the clip 6a and rivet 6b may be arranged either in the initiating site 2 of the molding 1 when, as shown in this case, it is configured as a through-hole, or, if needed for reasons of design or engineering, it is arranged outside of the initiating site 2 of the molding 1. When configured with a fastener, e.g. a clip, an "unbottoning" of the exposed insert fastener is achievable in the initiating site of the molding configured as a through-hole when the designed burst lines burst and with subsequent opening up of the flaps as long as an arresting element prevents the exposed insert from being released and catapulted into the vehicle interior where it could otherwise cause injury to the vehicle occupants. Depending on the size and configuration of the exposed insert 8 it may also be necessary to secure it by several fasteners such as clips 6a or rivets 6b to the molding 1. The exposed insert 8 may also be secured to the molding 1 by ultrasonic welding, bonding or some other suitable method.

Figure 6:
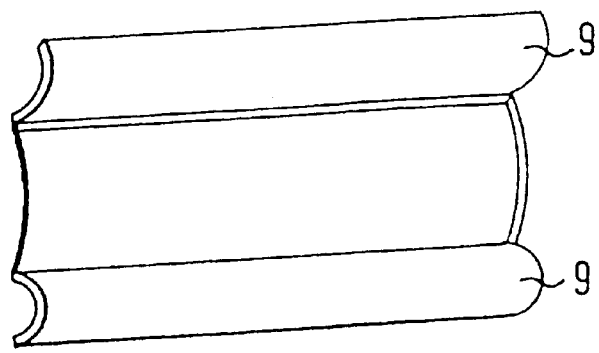
FIG. 6 is a view in perspective of the flaps of an air bag cover opened up after deployment of the air bag.

As evident from FIG. 1 the designed burst lines 3 and 3a on the molding 1 are preferably configured in the shape of an H. When the air bag is deployed the designed burst lines 3 and 3a of the molding 1 and the decorative covering 4 burst to thus form the two flaps 9 as shown in FIG. 6 which open up so that the air bag is able to unfold and be charged with the gas made available by the inflator.

What is claimed is:

1. A decorative covering in combination with an air bag cover for use in motor vehicles, said airbag cover having a molding including designed burst lines (3, 3a), said decorative covering being applied to said molding, said decorative covering having at least one locally confined initiating site (5) whereby bursting of said decorative covering along said designed burst lines (3, 3a) of said molding is initiating at said initiating site (5) of said decorative covering (4) when the air bag is deployed and wherein said initiating site of said decorative covering is concealed under an exposed insert (8) secured to said molding (1).

2. The decorative covering in combination with an air bag cover as set forth in claim 1 wherein said initiating site (5) of said decorative covering (4) is formed by a through-hole.

3. The decorative covering in combination with an air bag cover as set forth in claim 2 wherein said through-hole of said initiating site has a contour comprised of sharply tapered sections for defined initiation of bursting.

4. The decorative covering in combination with an air bag cover as set forth in claim 1 wherein the decorative covering is made of leather, an artificial leather, or a plastics film of polyurethane, polyvinyl chloride, acrylonitrile acrylic ester, or acrylonitrile butadiene styrene.

5. The decorative covering in combination with an air bag cover as set forth in claim 1 wherein the molding comprises at least one locally confined initiating site (2) coinciding in location with said initiating site (5) of said decorative covering and in which bursting of said designed burst lines (3) of said molding (1) is initiated when the air bag is deployed.

6. The decorative covering in combination with an air bag cover as set forth in claim 5 wherein said initiating site of said molding is comprised of a through-hole.

7. The decorative covering in combination with an air bag as set forth in claim 1 wherein said exposed insert (8) is secured by bonding or ultrasonic welding to said molding (1).

8. The decorative covering in combination with an air bag cover as set forth in claim 1 wherein an arresting element (7) is secured to said exposed insert (8) so that it cannot be torn out of place, said arresting element being connecting to said molding to prevent said exposed insert (8) from being released at random from said molding when said air bag is deployed.

9. The decorative covering in combination with an air bag cover as set forth in claim 1 wherein said designed burst lines (3, 3a) define several flaps (9) which open up when said air bag is deployed.

10. The decorative covering in combination with an air bag cover as set forth in claim 1 wherein the arrangement of said designed burst lines (3, 3a) is in the shape of an H, and wherein said exposed insert (8) conceals at least part of the transverse designed burst line (3a).

11. The decorative covering in combination with an air bag cover as set forth in claim 1 wherein said exposed insert (8) is secured by bonding or by ultrasonic welding to said molding (1).

12. The decorative covering in combination with an air bag cover as set forth in claim 1 wherein said exposed insert (8) is secured by at least one fastener such as a clip (6a) or rivet (6b) to said molding (1).

* * * * *